April 22, 1958 A. ZAHNER 2,831,693

RECORD CHANGER

Filed July 19, 1955

5 Sheets-Sheet 1

INVENTOR

ADRIEN ZAHNER

BY Young, Emery & Thompson

ATTYS.

April 22, 1958

A. ZAHNER 2,831,693

RECORD CHANGER

Filed July 19, 1955

5 Sheets-Sheet 2

INVENTOR

ADRIEN ZAHNER

BY Young, Emery & Thompson

ATTYS.

April 22, 1958 A. ZAHNER 2,831,693

RECORD CHANGER

Filed July 19, 1955 5 Sheets-Sheet 3

INVENTOR
ADRIEN ZAHNER
By Young, Emery & Thompson
ATTYS.

April 22, 1958 A. ZAHNER 2,831,693

RECORD CHANGER

Filed July 19, 1955

5 Sheets-Sheet 4

INVENTOR

ADRIEN ZAHNER

By Young, Emery & Thompson

ATTYS.

April 22, 1958

A. ZAHNER 2,831,693

RECORD CHANGER

Filed July 19, 1955

5 Sheets-Sheet 5

INVENTOR

ADRIEN ZAHNER

By Young, Emery & Thompson
ATTYS.

United States Patent Office 2,831,693

Patented Apr. 22, 1958

2,831,693

RECORD CHANGER

Adrien Zahner, Sainte-Croix, Switzerland, assignor to Thorens S. A., Sainte-Croix, Switzerland, a Swiss company Application July 19, 1955, Serial No. 523,094

Claims priority, application Switzerland August 28, 1954

2 Claims. (Cl. 274—10)

In the record changers provided with a vertical record carrying rod coaxial to the axis of rotation of the turn-table, it is necessary to foresee a counterbalancing device of the stack of spare records resting on the bearing surface or surfaces provided on said record carrying rod.

Indeed said bearing surfaces are generally arranged dissymmetrically and are in all cases of very small sizes, so that during the operations of delivery of the successive records, it is necessary to maintain the stack of spare records in a horizontal plane.

In the known record changers, this counterbalancing of the stack of spare records is realized either by means of an articulated counterbalancing arm, the extremity of which rests on the uppermost record of the stack of records, or by means of a record pressure disk sliding along the record carrying rod and resting on the last record of the stack of spare records. In both cases it is necessary, in order to allow the loading or the unloading of the talking machine, to perform manual operations in order to take away from the axis of rotation of the turn-table and then to bring back again in its service position, the counterbalancing arm of the record pressure disk. Said manual operations complicate the setting in action of the record changer and further necessitate often an important supplementary space in order to allow said manual operations, especially when the record changer is encased in a cabinet.

The objective of the present invention is to simplify the manual control of a record changer of the kind described before and to reduce to a minimum the space necessary for the loading and the unloading of the record changer.

To this effect, the record changer of the kind described before, comprises an actuating device of the counterbalancing arm causing automatically on the one hand, the setting in place of said arm on the stack of the spare records at the beginning of the setting in action of the record changer, and on the other hand, the disengagement of said arm after the playing of the last record of the stack of spare records.

The attached drawing shows schematically and by way of example a form of execution of the talking machine object of the invention.

Figure 1:
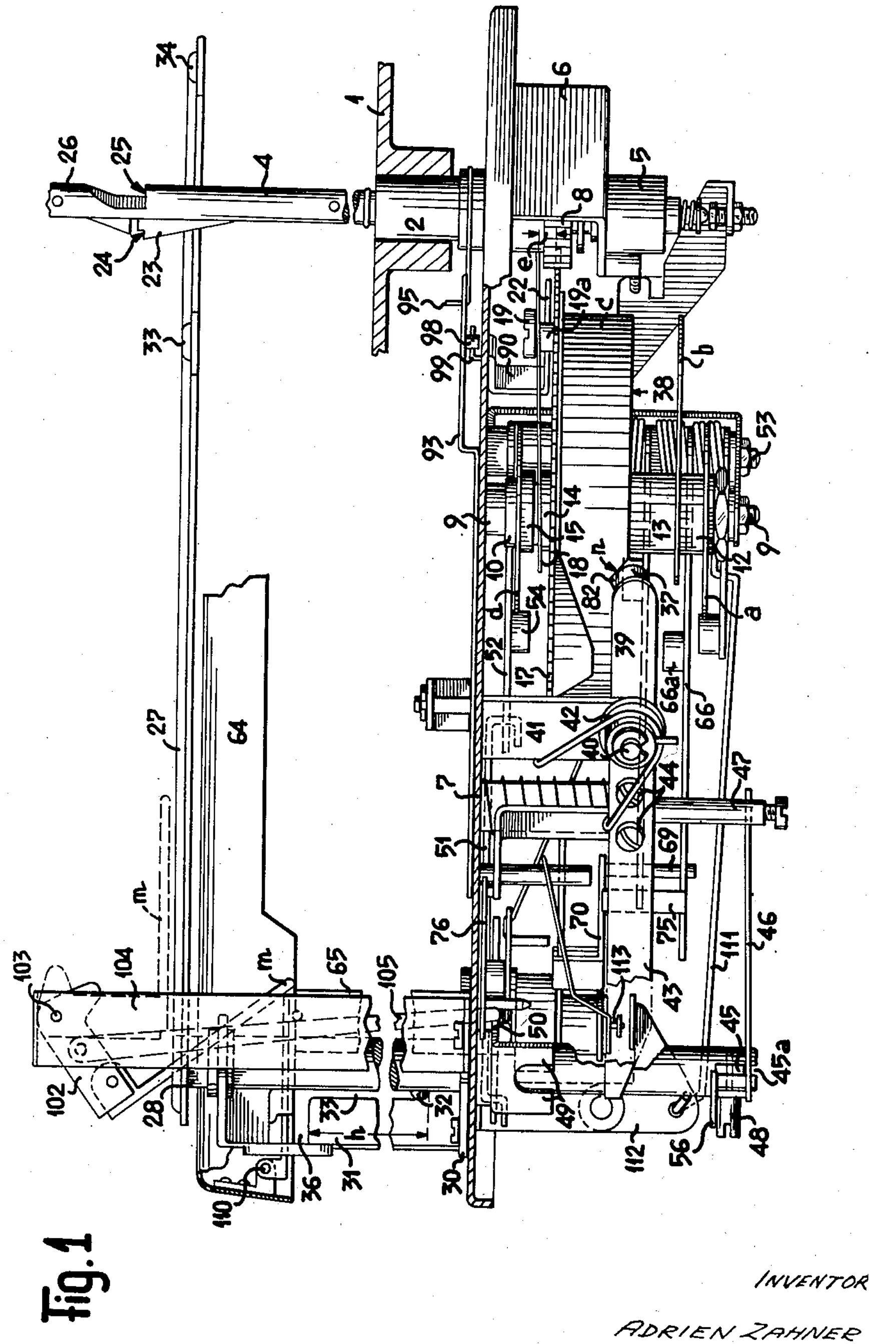
Fig. 1 is a side view of the mechanism of the record changer, certain parts being seen in cross section.

According to the attached drawing, the record changer comprises a turn-table 1 secured on a part 2 of a sleeve 3 revolving freely around a record carrying rod 4, fastened to a base-plate 7 of the mechanism of the record changer, by means of a sleeve 5 riveted on a flange 6 presenting the shape of a U.

An electric motor (not represented) drives the turn-table 1 by means of a friction transmission device of a known kind and comprising a runner maintained in contact with the peripheric contour of the turn-table. Such a transmission device is described for instance in the U. S. Patent No. 2,704,461.

In a variant of the record changer, said transmission device could be constituted by a gearing transmission device of known kind. In this case the axis of the turn-table carries a pinion connected by means of gears to the driving shaft of the driving motor.

The record changer illustrated comprises also an automatic control device of all the operations necessary for the record changer. Said device, of known kind, comprises a set of coaxial cams of which only the cams *a, b, c, d* are visible on the drawing. Said set of cams, fastened to a toothed wheel 17, controls the displacements of the different members of the record changer and is driven in the rotating movement of a sleeve 10 revolving freely on a pivot 9 riveted in the base-plate 7. The relative angular positions of the cams and of the toothed wheel 17 are defined by intermediate members 12, 13, 14 and 15 engaged on the sleeve 10 and tightened by means of a nut 11.

Said set of cams is set in action after the playing of each record, by means of a clutch device described hereunder, and the engagement of the two parts of which is controlled by the angular displacement of an arm 64 of the pick-up when the needle of said pick-up enters the record end groove having a large pitch.

The cams control all the operations necessary for the change of record, during a whole revolution of the toothed wheel 17. The mechanical connection connecting the pinion 8 rigidly fastened to the sleeve 3 with said toothed wheel 17, is automatically interrupted after a whole revolution of said wheel 17.

The clutch device comprises a small plate 18 engaged between the intermediate members 14 and 15 and freely displaceable between said intermediate members. Said small plate 18 is rotatively fastened to the toothed wheel 17. A screw 19 fastened on said toothed wheel and comprising an eccentric shaft 19*a* is engaged in a drilling provided in said small plate 18 and constitutes a guide for said small plate. A second drilling made in said small plate 18, is crossed by the sleeve 10. Besides, said small plate 18 carries at one of its extremities a toothed sector 20, the toothing of which corresponds exactly to the toothing of the wheel 17. Said toothed sector 20 is located opposite a cut-out 21 made in the toothed wheel 17.

By actuating the screw 19 it is possible to bring the toothed sector 20 in such an angular position that its toothing substitutes, over the length of the cutout 21, to the toothing of the wheel 17.

The small plate 18 may occupy the two following positions:

(*a*) A service position for which said small plate 18 rests on the upper face of the toothed wheel 17 in such a way that the toothed sector 20 ensures a continuous meshing of the pinion 8;

(*b*) A rest position (illustrated on Fig. 1) for which the toothed sector 20 lifted up by a finger 22 is located at a distance *e* from the toothed wheel 17 which is sufficient for said toothed sector 20 being out of engagement with the pinion 8.

Figures 5, 6:
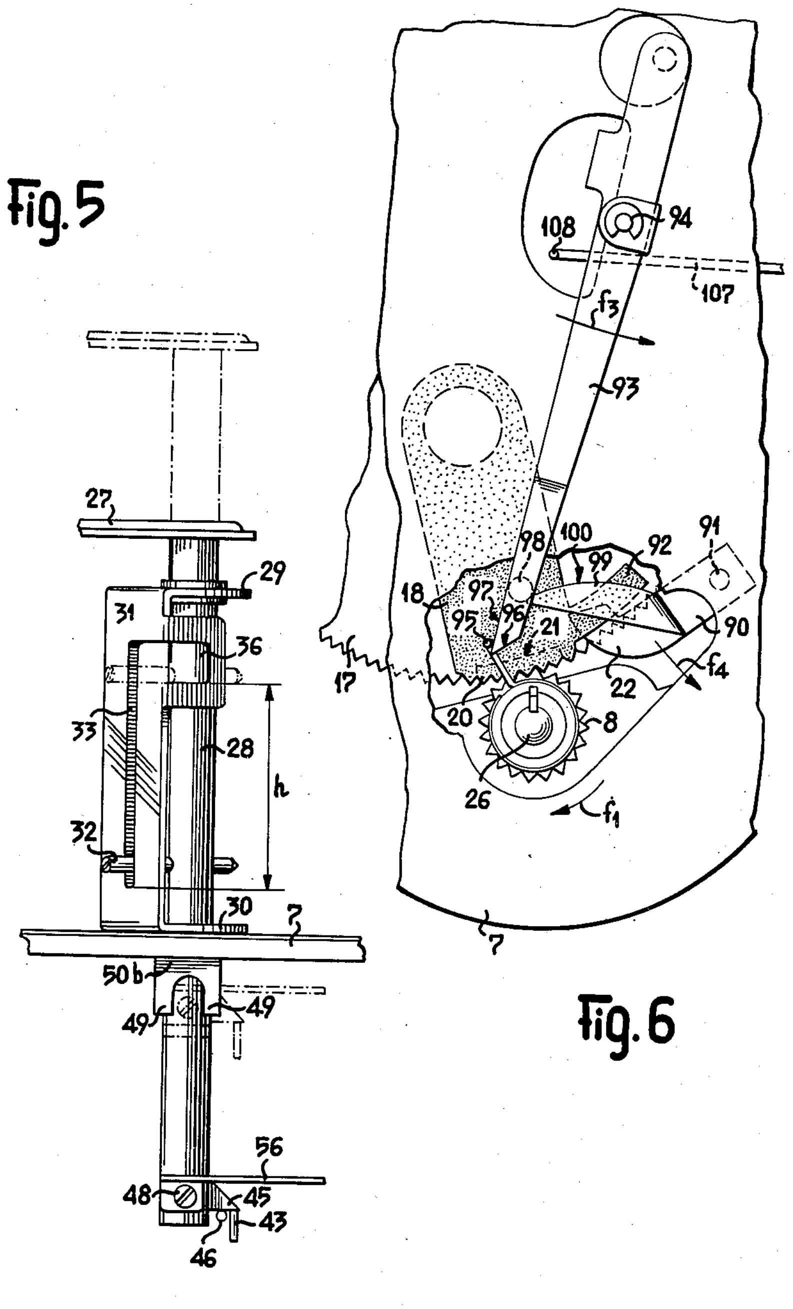
Figs. 5 and 6 are detail views.

The finger 22 maintains the small plate 18 in its rest position during the whole time of the playing of a record. Said finger 22 is carried by a lever 90 pivoted at 91 on the base plate 7. Said lever 90 carries further an actuating member 99 crossing an opening made in the base plate 7 and emerging from the upper face of said base plate. The finger 22 is maintained in its position represented on Figs. 1, 2 and 6, by a return spring 101.

An actuating device controlled by the angular displacements of the pick-up arm 64 when the needle enters the record end groove with large pitch, causes the withdrawal of the finger 22 against the action of the spring 101 and thus the meshing of the toothed sector 20 with the pinion 8. Said actuating device of known kind, comprises an oscillating lever 93 freely pivoted on a pivot 94 fastened to the base plate 7. Said oscillating lever is driven by means of a friction driving device of known kind, by the arm 64 of the pick-up in the direction of the arrow $f_3$. However, as long as the needle of the pick-up is engaged in the registering groove, said lever 93 is pulled back at each revolution of the turn-table 1 by a driver 95 cooperating with an incline 96. Besides, when the needle of the pick-up enters into the record end groove, which presents a great pitch, the displacement of the arm 64 of the pick-up and thus of the lever 93 driven by friction, presents an amplitude sufficient for the driver 95 to reach the lateral edge 97 of said lever 93 and drives said lever in the direction of the arrow $f_3$.

During said displacement of the lever 93, a pin 98 carried by said lever, cooperates with a slope 100 of the arm 99 carried by the lever 90, and pulls back said lever which rocks according to the arrow $f_4$. The finger 22 escapes then from the small plate 18 and falls down under the action of its own weight on to the upper face of the toothed wheel 17. Consequently, the toothed sector 20 meshing with the pinion 8, establishes a mechanical connection between said pinion 8 and the toothed wheel 17. The driver 95 carrying on its rotation escapes from the extremity of the lever 93 and the spring 101 pulls back the lever 90 until the position represented on Fig. 6.

The toothed wheel 17 and the set of cams are driven in rotation by the pinion 8 and near before the end of a whole revolution of said toothed wheel 17, an inclined beak 92 carried by the small plate 18, engages over the finger 22 and slides along said finger causing thus the lifting up of said small plate 18 until its rest position for which the toothed sector 20 is out of reach of the pinion 8. Thus, when the cut-out 21 of the toothed wheel 17 comes opposite said pinion 8, the mechanical connection connecting said pinion to the toothed wheel, is automatically interrupted. At this moment a runner 37 which cooperates under the action of a spring 42 with the contour 38 of the cam *c*, is located on the inclined wall *n* of a cut-out 82 made in said contour 38. Said spring 42 furnishes then the necessary energy to bring back the set of control cams until its rest position represented on Fig. 1, and for which the mechanical connection between the pinion 8 and the toothed wheel is entirely interrupted. The set of cams is immobilized whilst the turn-table is driven further in rotation by the motor of the record changer.

The record carrying rod 4 is provided with a record delivery device controlled by the set of control cams. Said device is on principle similar to the device described and illustrated in the U. S. Patent No. 2,684,248 and will not be described here in detail.

For an understanding of the invention, it is sufficient to note that the stack of spare records rests on a bearing face 25 provided on the record carrying rod 4. A push-rod 23, actuated by the set of cams, causes a lateral displacement of the undermost record, in such a maner that said record escapes from the bearing face 25 and falls down on the turn-table 1.

However in the record changer object of the invention, the push-rod 23 presents also a bearing surface 24. Said surface is located in the same horizontal plane as the bearing surface 25. Thus, the undermost record of the stack of spare records rests on two bearing surfaces 24 and 25 disposed symmetrically with respect to the axis of rotation of the records engaged on the prolongation 26 of the record carrying rod 4. It follows that the stack of spare records rests in a position which is near the horizontal position.

To ensure the horizontality of the stack of records during the operation of delivery of the successive records, the record changer comprises a counterbalancing arm 27 riveted on the upper extremity of an axis 28. Said axis slides and revolves in two guides 29 and 30 provided on the two horizontal arms of a flange 31 having the shape of a U rigidly fastened to the base-plate 7.

A pin 32 rigidly fastened to the axis 28 is engaged in a longitudinal slot 33 made in the flange 31. Said slot 33 is of a width corresponding to the diameter of the pin 32 so that the axis 28 may perform only axial displacements.

Figure 3:
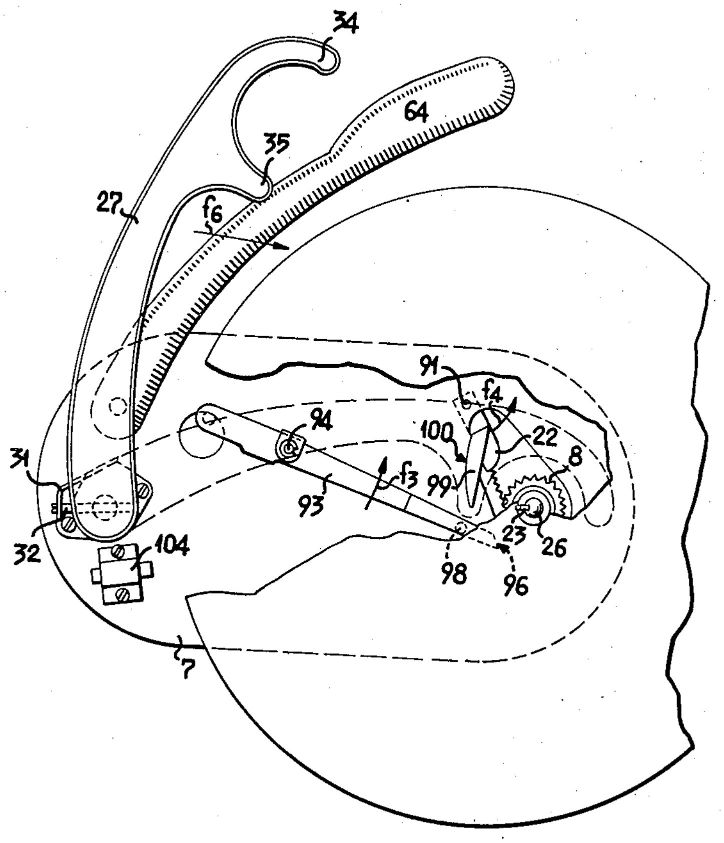
Fig. 3 is an upper view at a lesser scale, certain parts being cut away for more clearness of the drawing.

The upper extremity of the slot 33 opens in an horizontal groove 36, the length of which is sufficient in order to allow a counter-clockwise horizontal displacement of the counterbalancing arm 27 (Fig. 3), of a sufficient amplitude in order to entirely disengage said arm from the way of a record of 12 inch diameter sliding along the record carrying rod 4.

When the pin 32 rests on the lower extremity of said slot 33 (Fig. 1), the extremity of the counterbalancing arm 27 is located in a plane which is lower than the plane of the bearing face 25. The height *h* of said slot 33 is greater than the greatest height of the stack of spare records and the angular position of said slot is foreseen in such a manner that the extremity of the counterbalancing arm having the shape of a fork 34, 35, becomes approximatively centered on the record carrying rod 4.

The record changer comprises an automatic control device of the vertical and horizontal displacements of the counterbalancing arm 27.

(1) The control device of the vertical displacements presents the following members:

(*a*) The cam *c* rigidly fastened on the wheel 17 and which presents the shape of a bell, the edge 38 of which comprises two slopes $r_1$ and $r_2$ and the cut-out 82.

(*b*) An oscillating lever 39 provided on the one hand with a trunnion 40 engaged in the opening of an ear 41 riveted on the base-plate 7, and on the other hand, with a runner 37 maintained by the spring 42 in contact with the lower contour 38 of the cam *c*.

(*c*) A spring blade 43 secured by means of two screws 44 on the extremity of the lever 39 opposite to the extremity carrying the runner 37. Said spring blade oscillates with the lever 39 in a plane parallel to the axis 28 carrying the counterbalancing arm 27.

(*d*) A pawl 45 oscillating on an axis **45*b* and housed in a longitudinal slit 45*a* made in the lower extremity of the axis 28**.

(*e*) A fixed abutment constituted by a steel wire 46 rigidly fastened to a small column 47 fastened to the base plate 7.

After the playing of each record, the set of cams is set in rotation by the above described clutch device and the slopes $r_1$ and $r_2$ of the cam *c* control the lowering and then the lifting up of the spring blade 43. However, the pawl 45 being withdrawn in the inner of the slit **45*a*, the movements of said spring blade 43** remain without effect on the counterbalancing arm.

Figure 2:
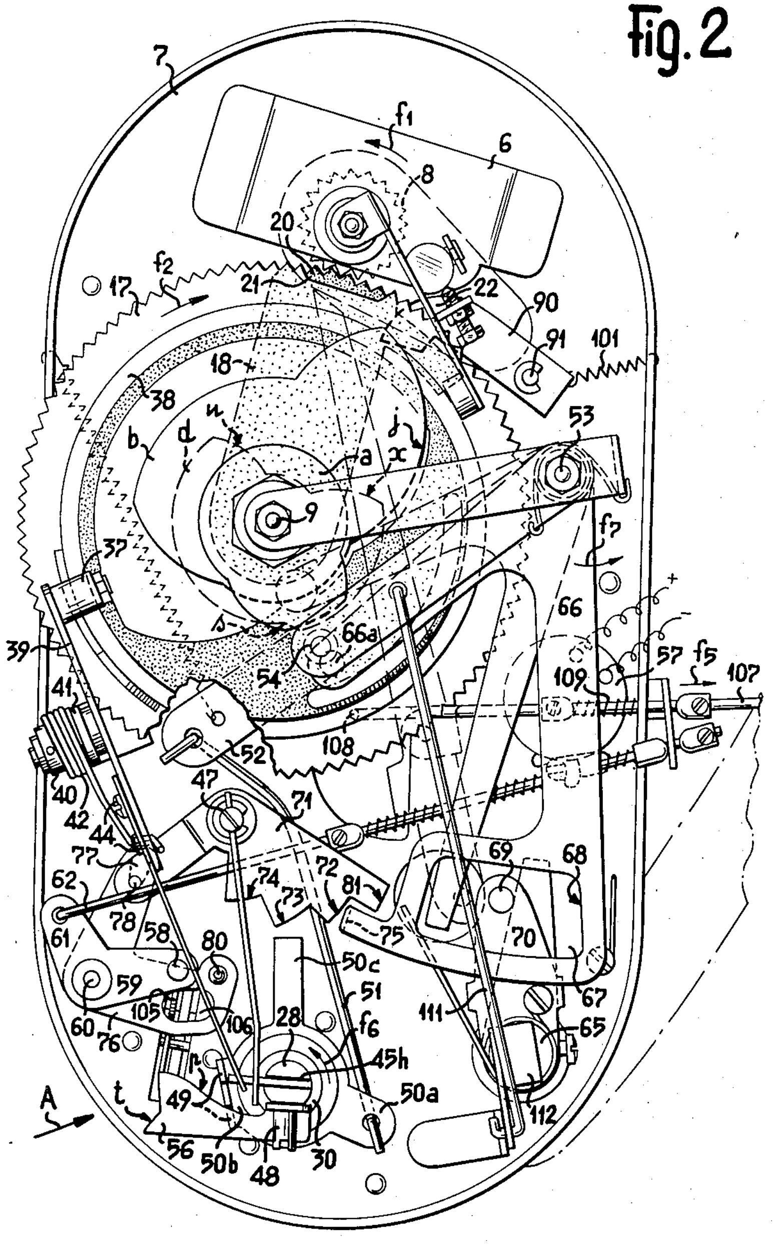
Fig. 2 is a view of the under part.
Figure 4:
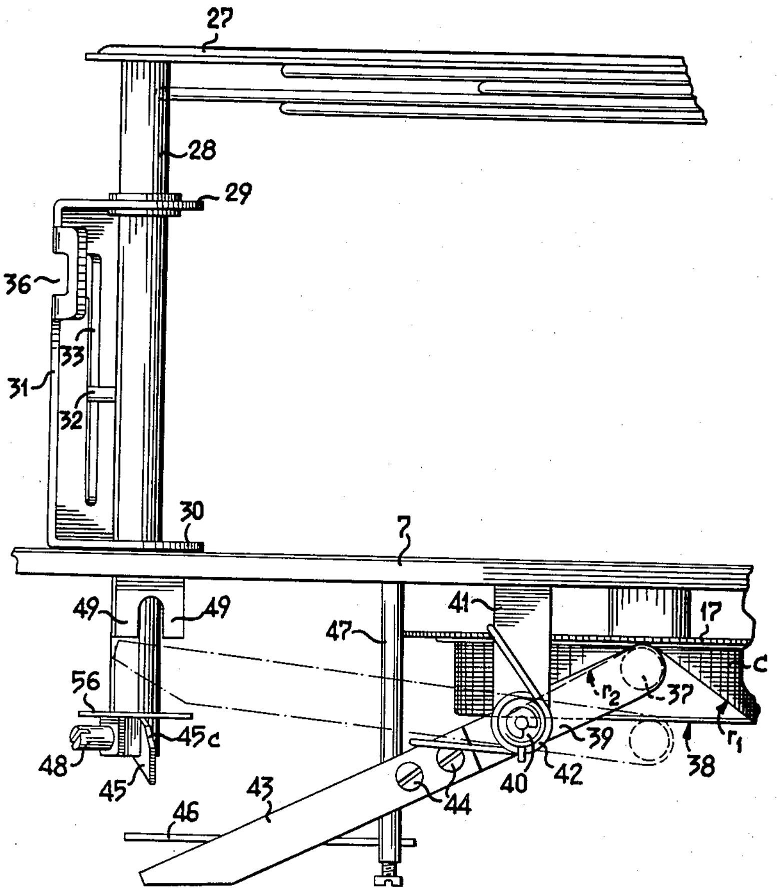
Fig. 4 is a side view, in the direction of the arrow A of Fig. 2, of the control device of the rising of the counterbalancing arm.

On the other hand, when the last record of the stack of the spare records leaves the bearing surface 25 and falls down on the turn-table 1, the counterbalancing arm 27 lowers until its lowest rest position represented on Fig. 1 and defined by the pin 32 resting on the bottom of the slot 33. During said latter fall of the arm 27, the pawl 45 comes to lean onto the abutment constituted by the steel wire 46. Said steel wire 46 makes then rocks the pawl 45 around its axis **45*b* in such a manner as to cause said pawl to emerge outside of the slit 45*a* and to place said pawl 45 onto the path of the spring blade 43. However, said pawl presents an incline 45*c* intended to push back laterally the spring blade 43 when said spring blade lowers, driven in the movement of the oscillating lever 39, when the runner 37 runs along the slope $r_1$. Said spring blade 43 escapes then from the pawl 45 owing to its lateral elasticity and comes under the pawl 45 (position represented in continuous lines on Fig. 4). The cam $c$ carrying on its rotation, the lever 39 is actuated backwards by the slope $r_2$ of the cam $c$ and the spring blade 43 lifts in order to come in the position illustrated in dotted lines on Fig. 4. During said displacement, said blade 43 abuts against the pawl 45 so that a mechanical connection is established between the cam $c$ and the axis 28 carrying the counterbalancing arm. The pawl 45 lifted up through the blade 43 drives thus in its displacement, the axis 28 carrying the counterbalancing arm 27. The pin 32 runs then the whole height $h$ of the slot 33 and reaches the level of the horizontal groove 36**.

(2) The control device of the horizontal displacements comprises the following members:

(*a*) The cam $h$ rigidly fastened to the toothed wheel 17.

(*b*) A lever 52 pivoted on a small column 53 rigidly fastened to the base plate. Said lever 52 carries a runner 54 maintained by a return spring in contact with the contour of the cam $d$.

(*c*) A sleeve 50 provided with three beaks **50*a*, 50*b*, 50*c*. Said sleeve revolves freely around a guide 30 coaxial to the axis 28** carrying the counterbalancing arm.

(*d*) A mechanical connection constituted by a rod 51 and connecting the arm **50*a* to the lever 52**.

(*e*) A clutch device establishing a temporary mechanical connection between the sleeve 50 and the axis 28. Said device comprises on the one hand, two fingers 49 forming a fork, disposed parallelly to the axis 28 and carried by the arm **50*b* and, on the other hand, a driving finger 48 fastened at the lower extremity of the axis 28**.

At the end of the vertical upwards displacement of the axis 28 controlled by the slope $r_2$ of the cam $c$, the driving finger 48 engages the fork 49.

Consequently, by the setting in rotation of the set of cams after the playing of a record of the stack of the spare records, the axis 28 being no longer lifted up by the spring 43 as described here above, the cam $d$ is no longer mechanically connected to the axis 28, so that the oscillating movement imparted by said cam $d$ to the lever 52 and the sleeve 50, remains without effect on the angular position of the counterbalancing arm 27.

On the other hand, when after the falling down and the playing of the last record of the spare stack on the turn-table 1, the spring blade 43 controlled by the slopes $r_1$ and $r_2$ of the cam $c$ has caused, as described above, the lifting up of the counterbalancing arm, the finger 48 engaged in the fork 49 establishes a mechanical connection between the cam $d$ and the axis 28. Consequently, the slopes $u$ and $s$ of said cam $d$ cause a horizontal angular displacement of the counterbalancing arm 27. The pin 32 displaces along the groove 36 and the pawl 45 escapes from the spring blade 43. The counterbalancing arm 27 is maintained in its upper position by the pin 32 resting against the lower edge of the groove 36.

Said angular displacement is of a sufficient amplitude in order that the counterbalancing arm 27 comes in a peripheric position entirely disengaged and freeing entirely the space necessary for the loading and the unloading of records of 30 cm.

The record changer is further provided with a control device of the vertical and horizontal displacements of the pick-up arm 64. Said control device of known kind already described in the U. S. Patent 2,521,121 and in the Swiss Patent No. 304,080 of October 13, 1952, will not be described here in detail but only in the necessary way for the good understanding of the invention.

The arm 64 of the pick-up is hinged along an horizontal axis 110 carried by a support fastened at the upper extremity of a vertical axis 65. The vertical displacements of the pick-up are controlled by the cam $e$ and by the intermediary of a rod 111, of a lever 112 and of a push-rod 113, the upper extremity of which acts on the arm 64. The horizontal displacements are controlled by the cam $b$ and by the intermediary of a lever 66 oscillating on a small column 53. One of the arms of said lever 66 carries a runner **66*a* cooperating under the action of a spring, with the control cam $b$ whilst its other arm presents a window 67 in which an actuating finger 69 is engaged which is rigidly secured to an arm 70 fastened to the hinge axis 65 of the arm 64 of the pick-up. The lateral edge 68 of said window 67 may bring, through an angular displacement of lever 66, the finger 65** in three well defined positions. To these three positions correspond three defined angular positions of the pick-up arm which correspond to the three record diameters in use today (30, 25 and 17 cm.)

Said three positions of the finger 69 are defined by a detecting device of the diameter of the records falling down on the turn-table 1. Said detecting device comprises:

(1) A detecting member $m$ constituted by an arm hinged on a lever 102. Said lever is pivoted on an axis 103 carried by a column 104 and presents an arm 105, the extremity of which is engaged in a slot 106 made in one of the arms of a lever 76 oscillating on an axis 60 rigidly fastened to the base-plate 7.

(2) A movable stop 71 pivoted on the small column 47 and connected to the second arm of lever 76 by a pin 78 engaged in a slot 77. Said movable stop 71 comprises three stop faces 72, 73, 74.

(3) An ear 75 rigidly fastened to the lever 66 and cooperating with one or the other of the stop faces 72, 73, 74 according to the angular position of the movable stop 71.

When a record falls down on the turn-table, said record makes, during its falling down, oscillate the detecting member $m$, which is in the position represented in dotted lines on Fig. 1, of an angle which is a function of the diameter of the record. Consequently, the movable stop 71 is also displaced angularly of a value function of the diameter of the record to be played. Thus, as described for instance in the Swiss Patent No. 295,131, the amplitude of the oscillations of the lever 66 controlled by the cam $b$ is limited by the ear 75 coming in contact with one or the other of the stop faces 72, 73, 74 at such a value that the needle of the pick-up will be situated above the edge of the record to be played. The set of cams controls then the lowering of the arm 64 of the pick-up, the needle of which alights on the rim of the record to be played.

In the record changer object of the present invention, the lever 76 carries further a pin 80 set on the path of an arm 56 carried by the axis 28 of the counter-balancing arm 27. During the angular displacement of said counterbalancing arm 27, in direction of its disengaged peripheric position, the edge $p$ of the arm 56, pushes back the pin 80 and causes the rocking of the lever 76 and of the movable stop 71.

The angular displacement of said stop is of a sufficient amplitude in order to set a fourth stop face 81 on the path of the ear 75 of the lever 66.

Said fourth stop face 81 defines a fourth angular position of the pick-up arm 64 for which said arm is in a position out of reach of a record of 30 cm. sliding along the record carrying rod 4. Thus, when the counterbalancing arm 27 is automatically brought in its disengaged peripheric position, the pick-up arm 64 is retained back, by the stop face 81, in its disengaged peripheric rest position.

Besides, the angular displacement of the lever 76 causes an oscillation of the detecting member $m$ which comes in the withdrawn position represented in continuous lines on Fig. 1 and for which said arm $m$ is out of reach of a record of 30 cm. sliding along the rod 4.

The record changer illustrated on the attached drawing is further provided with a stopping device causing the automatic stopping of the record changer after the playing of all of the records of the stack of spare records carried by the rod 4. Said stopping device comprises:

(*a*) A circuit breaker 57 inserted in the electric feeding circuit of the motor and provided with a control member 63;

(*b*) An actuating device of said member 63 controlled by the counterbalancing arm 27 reaching its disengaged peripheric position.

Said actuating device comprises a beak *t* fastened to the arm 56 secured at the lower extremity of the axis 28 and which cooperates with a pin 50 carried by one of the arms of an oscillating lever 59 pivoted at 60 on the base-plate 7 and mechanically connected by means of a rod 62 to the control member 63.

During the angular displacement of the counterbalancing arm in the direction of its disengaged peripheric position, the axis 28, displaced counter-clockwise (Fig. 2), drives the arm 50 in its displacement. The beak *t* actuates then the pin 58, what causes the oscillation of the lever 59, the second arm 61 of which exerts a pull on the rod 62 which acts directly on the control member 63 in order to cause the opening of the circuit breaker 57, and the automatic stopping of the record changer.

In order that the opening of the circuit breaker 57 takes place at the precise moment when the runner 37 reaches the incline *n* of the cut-out 82, the cam *d* which controls the horizontal displacements of the counterbalancing arm, comprises the slope *s* which causes—shortly before the toothed wheel 17 has performed a whole revolution—a rapid angular displacement of the lever 56 and of the counterbalancing arm 27. After the opening of the circuit breaker 57, the set of cams is brought in its angular rest position by the runner 37 cooperating with the incline *n* under the action of the spring 42. Said latter angular displacement of the toothed wheel 17, causes the breaking of the mechanical connection between said toothed wheel 17 and the turn-table 1.

The record changer represented is provided with a setting in working device comprising a manual control button (not illustrated) connected by a rod 107, on the one hand to the control member 63 of the circuit breaker 67, and on the other hand to an actuating finger 108 intended to act on the lever 93 driven by friction in the angular displacements of the pick-up arm 64. Said setting in working device being similar to that described in the above mentioned patents will not be described here in detail.

The working of the apparatus described is the following:

When the record changer is stopped, the pick-up arm 64 and the counterbalancing arm 27 are located in their disengaged peripheric position. The user may then engage, on the upper extremity of the record carrying rod 4, a certain number of records to be played. The lowest record of said spare stack rests on the bearing surface 25 of the rod 4 and on the shoulder 24 of the push-rod 23. The records of the spare stack remain in an approximatively horizontal position.

The cut-out 21 of the toothed wheel 17 is located opposite the pinion 8 and the small plate 18 is maintained by the finger 22 in its rest position for which its toothed sector 20 is out of reach of the pinion 8. Said rest position of the set of cams and of the toothed wheel 17 is fixed by the runner 37 engaged in the cut-out 82 made in the contour 38 of the cam *c*.

The detecting member *m* is in its withdrawn position represented in full lines on Fig. 1, and the stop face 81 of the movable stop 71 is located opposite the ear 75 of the lever 66.

The setting in working of the record changer is realized by the actuation of the control button, which exerts on the rod 107 a pull in the direction of the arrow $f_5$. A first angular displacement of said control button, bringing said button from its position "stop" to its position "start" causes the oscillation of the control member 63 and the closing of the circuit breaker 57. The motor set under voltage is driven in rotation and actuates the turn-table. However, the mechanical connection between the pinion 8 and the toothed wheel 17 being interrupted, the turn-table revolves freely.

By actuating the control button over a greater angular displacement until its unstable position designated "reject" by the manufacturers, the rod 107 is displaced in the direction of the arrow $f_5$ against the action of a spring 109, for said lever 63 may not be displaced over the closed position of the circuit breaker 57.

During said second displacement of the rod 107, the actuating finger 108 actuates the arm 93 in the direction of the arrow $f_3$. The pin 98 carried by said lever 93, cooperates then with the slope 100 of the arm 99 carried by the lever 90. Said lever 90 is thus displaced angularly against the action of its spring 101, and the finger 22 escapes from the small plate 18 causing, as described above the establishment of the mechanical connection connecting the pinion 8 to the toothed wheel 17.

From then on, the set of control cams driven in rotation controls during a whole revolution:

(1) The lifting up of the pick-up arm in order to disengage said arm from a rest stop.

(2) By a slope *j* of the cam *b* an angular displacement of the lever 66 in the direction of the arrow $f_7$ (Fig. 2) in order to take away the ear 75 from the stop faces of the movable stop 71. Said displacement of the lever 68 has no action on the pick-up arm, for the edge 68 of the window 67 moves off from the actuating finger 69 engaged in said window.

(3) By a slope *x* of the cam *d* and by the intermediary of the pin 48 engaged in the fork 49, the horizontal throwing in displacement of the counterbalancing arm 27. During said angular displacement in the direction of the arrow $f_6$ (Fig. 2), the arm 50*c* of the sleeve 50 comes in contact with the pin 80 carried by the lever 76. Consequently, the movable stop 71 is displaced angularly till its position corresponding to the record of the smallest diameter, for which the stop face 74 is located on the path of the ear 75 of the lever 66. Besides, the angular displacement of the lever 76 causes the return of the detecting member until its service position (represented in dotted lines on Fig. 1) by the intermediary of an arm 105 the extremity of which is engaged in the slot 106. Said slope *x* causes an angular displacement of the axis 28 of an amplitude which is sufficient in order that the pin 32 will come opposite the slot 33. At this moment, said axis 28 falls down until the extremity of the counterbalancing arm 27 rests on the stack of spare records in order to maintain said stack in a horizontal plane.

(4) The set of control cams controls then the delivery of a record, by the actuating of the push-rod 23. The lowest record of the stack of records falls down on the turn-table and actuates during its falling down the detecting member *m* in order to set on the path of the ear 75 of the lever 66, the stop face of the movable stop 71 corresponding to the diameter of the record which has been falled on the turn-table.

(5) The set of cams controls then the horizontal throwing in displacement of the pick-up. The amplitude of said displacement is limited in function of the diameter of the record to be played, by the stop face 72, 73 or 74, set in service position by the falling down of the record.

(6) The set of cams controls the lowering of the pick-up arm, the needle of which alights on the rim of the record to be played.

(7) After a whole revolution of the wheel 17, the mechanical connection connecting the pinion 8 to the toothed wheel 17, is interrupted, as described above, and the toothed wheel stops in the position represented on Fig. 1, defined by the runner 37 engaged in the cut-out 82 of the cam *c*.

At the end of the playing of the record which has falled down on the turn-table, the needle of the pick-up comes in the last groove having a great pitch and causes, as described above, a new setting in action of the set of cams which controls all the movements necessary to change the records. However, the action of the cams causing the lifting up and the throwing-out of the counterbalancing arm, remains without effect on said arm for, on the one hand the pawl 45 is in a withdrawn position out of reach of the spring blade 43 carried by the lever 39, and on the other hand, the driving finger 48 fastened to the axis 28 is in a too low position to be engaged in the fork 49.

After a whole revolution of the toothed wheel 17, the mechanical connection connecting the pinion 8 to the toothed wheel 17 is automatically interrupted as described above.

This cycle of operations repeats after the playing of each successive record falled down on the turn-table.

Finally, when the last record of the stack of spare records falls down on the turn-table, the counterbalancing arm 27 falls down till its lowest position, for which the pawl 45 is set in service position by the steel wire 46. Thus, when the needle of the pick-up enters the record end groove of said last record, the set of cams controls, as described before, the lifting up of the counterbalancing arm and its throwing-out until a disengaged peripheric position, the lifting up and the throwing-out of the pick-up arm 64, the setting in service position of the stop face 81 of the movable stop, in order to retain the arm 64 in its peripheric position, the withdrawal of the detecting member *m*, the lowering of the pick-up arm which comes to rest on a rest stop, the opening of the circuit breaker 57 and the opening of the feeding circuit of the motor and finally the interruption of the mechanical connection between the pinion 8 and the toothed wheel 17 which stops in the position represented on Fig. 1 and defined by the runner 37 engaged in the cut-out 82.

The records falled down on the turn-table may then be withdrawn easily by making them slide along the rod 4. New records may then be engaged on the prolongation 26 of the rod 4 and then the record changer may be set in working in the described manner.

I claim:

1. In an automatic record changer comprising a frame, a turntable, a spindle centrally mounted with respect to said turntable, record-supporting means provided on said spindle to hold a stack of records on said spindle above said turntable, dropping means associated with said supporting means to drop said records individually on said turntable, a counterbalancing arm engageable with the top surface of the uppermost record of said stack, the combination of a shaft secured to said counterbalancing arm, a support member on said frame located outside the periphery of said turntable, said shaft being rotatable and axially movable inside said support member, a cam track in said support member and comprising a lower portion substantially parallel to said shaft and an upper portion substantially perpendicular to said lower portion, a cam follower secured to said shaft and engaged in said cam track, whereby said cam follower engaged in said lower portion of said cam track defines a first angular position of said counterbalancing arm opposite the top surface of the uppermost record of said stack and for which said arm is engageable with said top surface, and whereby said cam follower engaged in said upper portion of said cam track defines a second angular position of said counterbalancing arm outside the periphery of the stack of records, a lifting member hinged on said frame and movable in a plane parallel to said shaft, first cam means to raise said lifting member during each record changing cycle of said changer from a lower to an upper position, a first clutch member hinged to said shaft, actuating means fastened to said frame and acting on said first clutch member when said shaft reaches its lowermost position corresponding to the dropping on the turntable of the last record of said stack, in order to bring said clutch member from a withdrawn position into an operative position, whereby said clutch member when in operative position is adapted to be engaged by said lifting member and driven in the raising movement of said lifting member to lift said counterbalancing arm from its lowermost position to its uppermost position for which said cam follower is located at the level of said upper portion of said cam track, an angular control member pivoted of said frame, second cam means to reciprocally drive, during each record changing cycle of said changer, said angular control member between two definite positions, and a second clutch member fastened to said shaft to be driven by said angular control member when said counterbalancing arm is in its uppermost position and the cam follower at the level of said upper portion of said cam track, whereby said arm is angularly displaced from said first to said second position.

2. The automatic record changer of claim 1 further comprising cam means secured to said shaft, and stop means of said changer actuated by said cam means when said counterbalancing arm reaches said second portion.

References Cited in the file of this patent

UNITED STATES PATENTS

| | | |
|---|---|---|
| 2,328,052 | Butler | Aug. 31, 1943 |
| 2,457,106 | Pressley | Dec. 21, 1948 |
| 2,529,474 | Stolberg | Nov. 7, 1950 |
| 2,541,072 | Jones | Feb. 13, 1951 |
| 2,637,558 | Fisher | May 5, 1953 |

FOREIGN PATENTS

| | | |
|---|---|---|
| 567,692 | Great Britain | Feb. 27, 1945 |
| 68,487 | Norway | Oct. 23, 1944 |